(12) United States Patent
Schlienger

(10) Patent No.: US 6,267,058 B1
(45) Date of Patent: Jul. 31, 2001

(54) COUPLING MECHANISM FOR MAGNETICALLY COUPLED TRANSPORTATION MODULE

(75) Inventor: Max P. Schlienger, Ukiah, CA (US)

(73) Assignee: Flight Rail Corporation, Ukiah, CA (US)

(*) Notice: Subject to any disclaimer, the term of this patent is extended or adjusted under 35 U.S.C. 154(b) by 0 days.

(21) Appl. No.: 09/535,229

(22) Filed: Mar. 24, 2000

Related U.S. Application Data

(63) Continuation-in-part of application No. 09/411,626, filed on Oct. 1, 1999, and a continuation-in-part of application No. 09/411,790, filed on Oct. 1, 1999.

(51) Int. Cl.[7] .................................................. B61B 13/00
(52) U.S. Cl. ....................................... 104/156; 104/138.1
(58) Field of Search ................................ 104/138.1, 139, 104/155, 156, 157, 165, 283; 191/18

(56) References Cited

U.S. PATENT DOCUMENTS

| 4,645,182 | * | 2/1987 | Stoll | 104/156 |
| 4,805,761 | * | 2/1989 | Totsch | 104/156 |
| 5,388,526 | * | 2/1995 | Imai | 104/138.1 |
| 5,537,929 | * | 7/1996 | Miura et al. | 104/156 |
| 5,564,339 | * | 10/1996 | Miura et al. | 104/138.1 |
| 5,826,701 | * | 10/1998 | Miura et al. | 104/156 |

* cited by examiner

Primary Examiner—Mark T. Le
(74) Attorney, Agent, or Firm—Townsend and Townsend and Crew LLP

(57) ABSTRACT

A coupling mechanism includes an inner magnetic coupler disposed inside a thrust tube and an outer magnetic coupler disposed outside the thrust tube. The inner and outer magnetic couplers are spaced by a non-metallic portion of the thrust tube. The inner magnetic coupler is movable relative to the wall in a direction of movement. The outer magnetic coupler is magnetically coupled with the inner magnetic coupler to be moved by the inner magnetic coupler. The inner magnetic coupler includes an inner magnetic bar and a plurality of inner magnetic blocks coupled to the inner magnetic bar. The inner magnetic blocks are disposed between the inner magnetic bar and the thrust tube. The inner magnetic bar is opposite in polarity from the inner magnetic blocks. The inner magnetic blocks are arranged in series and are alternately spaced by a plurality of inner nonmagnetic spacers in the direction of movement. The outer magnetic coupler includes an outer magnetic bar and a plurality of outer magnetic blocks coupled to the outer magnetic bar. The outer magnetic blocks are disposed between the outer magnetic bar and the thrust tube. The outer magnetic bar is opposite in polarity from the outer magnetic blocks. The outer magnetic blocks are arranged in series and are alternately spaced by a plurality of outer nonmagnetic spacers in the direction of movement. The outer magnetic bar is the same in polarity as the inner magnetic bar. The inner magnetic blocks and outer magnetic blocks are staggered in position along the direction of movement when the inner and outer magnetic couplers are substantially stationary. The inner magnetic blocks and outer magnetic blocks move closer toward substantial alignment with each other as the inner and outer magnetic couplers increase in speed, thereby changing the magnetic coupling from an attraction mode to a repulsion mode.

16 Claims, 8 Drawing Sheets

COUPLING MECHANISM FOR MAGNETICALLY COUPLED TRANSPORTATION MODULE

CROSS-REFERENCES TO RELATED APPLICATIONS

This application is a continuation-in-part of and claims priority from U.S. patent application, Ser. No. 09/411,626, entitled "Pod Assembly for Light Rail Transportation", filed Oct. 1, 1999, and U.S. patent application, Ser. No. 09/411,790, entitled "Guideway System for Light Rail Transportation", filed Oct. 1, 1999. This application is related to concurrently filed and commonly assigned U.S. patent application, Ser. No. 09/534,810, entitled "Magnetically Coupled Transportation Module".

BACKGROUND OF THE INVENTION

This invention relates to a transportation system and, more particularly, to a guideway system for light rail transportation.

Rapid mass ground transportation systems offer many benefits over non-mass transportation means such as the use of automobiles, particularly in metropolitan areas experiencing severe traffic congestion and pollution problems. Mass ground transportation may also be a desirable alternative for short-range as well as long-range air travel. Although there has been a general recognition of the need for a reliable, safe rapid transportation system, utilization of rapid transit systems has been hindered by the high cost of construction and operation as well as technical difficulties in developing an efficient and versatile light rail system.

Conventional approaches have not produced a light rail transportation system that is sufficiently versatile, efficient, and cost-effective to be a feasible substitute for non-mass transportation and air travel alternatives. For instance, some so-called light rail systems have rather heavy transportation modules due to the use of heavy undercarriage or a heavy power system, high traction requirements, high onboard fuel requirements, or the like. Systems that rely on traction drives tend to have difficulty with steep grades. Moreover, external elements such as severe weather conditions and contaminations can pose substantial difficulty in the operation and maintenance of light rail systems. Additionally, traction drive mechanisms employing wheels tend to produce a lot of noise as well as wear.

SUMMARY OF THE INVENTION

The present invention overcomes the difficulties and disadvantages of the prior art by providing simple solutions to specific problems associated with developing an efficient and cost-effective light rail transportation system. The invention provides a guideway system that does not depend on traction for movement. In a specific embodiment, the pod assembly is placed inside a guide tube, the exterior of which preferably supports and guides the vehicle as it moves along the tube. Motion is generated by providing a pressure differential inside the tube between the upstream region and the downstream region of the pod assembly. The pressure differential is preferably generated by a stationary power system that produces a vacuum on the downstream region or pressurizes the upstream region or both. The speed of the pod assembly is controlled by modulating the amount of gas flow through the pod, that is, from the upstream side to the downstream side of the pod. The speed of the pod assembly is increased by reducing the amount of gas flow through the pod assembly to thereby increase the thrust on it, and is decreased by permitting a larger amount of gas to flow past the pod assembly to decrease the thrust.

Because the thrust required to move the pod assembly is generated by stationary power systems, the vehicle does not require heavy on-board engines or drive trains. The pod assembly and guide tube are relatively light in weight and are well-suited for use in a light rail system. The guide tube can be elevated because of the light overall weight of the system, reducing right-of-way costs. When elevated, grading costs and requirements are significantly reduced.

A magnetic coupling apparatus is used to couple the pod assembly inside the guide tube with the transportation module outside the guide tube. The transportation module is supported by the exterior surface of the guide tube. The coupling apparatus advantageously reduces running friction and loading on the guide tube. During acceleration and normal running of the transportation module, the magnetic field between the inner magnetic coupler connected to the pod assembly and the outer magnetic coupler connected to the transportation module is in a repulsion mode rather than an attraction mode. This minimizes the load of the vehicle on the guide tube by pushing them away from the guide tube. This reduces the mechanical stress on the guide tube. By the same action the inner magnetic coupler connected to the pod assembly is also repelled from the inner surface of the guide tube to minimize the load. The decrease in loads results in a decrease in friction and drag between the stationary guide tube and the moving inner and outer magnetic couplers.

In accordance with an aspect of the present invention, a magnetically coupled drive apparatus comprises a wall made of a non-metallic material. A first magnetic coupler and a second magnetic coupler are disposed on opposite sides of the wall. The first magnetic coupler is movable relative to the wall in a direction of movement. The second magnetic coupler is magnetically coupled with the first magnetic coupler to be moved by the first magnetic coupler. The first magnetic coupler includes a first magnetic bar and a plurality of first magnetic blocks coupled to the first magnetic bar. The first magnetic blocks are disposed between the first magnetic bar and the wall. The first magnetic bar is opposite in polarity from the first magnetic blocks. The first magnetic blocks are arranged in series and are alternately spaced by a plurality of first nonmagnetic spacers in the direction of movement. The second magnetic coupler includes a second magnetic bar and a plurality of second magnetic blocks coupled to the second magnetic bar. The second magnetic blocks are disposed between the second magnetic bar and the wall. The second magnetic bar is opposite in polarity from the second magnetic blocks. The second magnetic blocks are arranged in series and are alternately spaced by a plurality of second nonmagnetic spacers in the direction of movement. The second magnetic bar is the same in polarity as the first magnetic bar.

In some embodiments, the first magnetic blocks and second magnetic blocks are staggered in position along the direction of movement when the first and second magnetic couplers are substantially stationary. The first magnetic blocks and second magnetic blocks move closer toward substantial alignment with each other as the first and second magnetic couplers increase in speed, thereby changing the magnetic coupling from an attraction mode to a repulsion mode.

In accordance with another aspect of the invention, a method of magnetically driving a transportation module comprises providing a drive member in a thrust tube including a non-metallic, nonmagnetic portion extending longitudinally along the thrust tube. An inner magnetic coupler is provided inside the thrust tube. An outer magnetic coupler is provided outside the thrust tube and is connected with the transportation module disposed on the thrust tube. The inner and outer magnetic couplers are disposed on opposite sides of the non-metallic, nonmagnetic portion of the thrust tube. The inner and outer magnetic couplers are magnetically coupled in attraction when the inner and outer magnetic couplers are substantially stationary with respect to the thrust tube. The drive member is thrusted to move the inner magnetic coupler along the thrust tube in a direction of movement. The inner magnetic coupler moves the outer magnetic coupler, changing the magnetic coupling between the inner and outer magnetic couplers from attraction to repulsion as the speed increases.

In accordance with another aspect of the invention, a transportation system for moving a transportation module comprises a thrust tube including a longitudinal guide slot disposed in an inner surface of the thrust tube. A drive member is disposed inside the thrust tube to be thrusted along the thrust tube. An inner magnetic coupler is disposed inside the thrust tube and connected with the drive member to be moved by the drive member. At least a portion of the inner magnetic coupler is disposed in the longitudinal guide slot. An outer magnetic coupler is disposed outside the thrust tube and is configured to connect with a transportation module. The outer magnetic coupler is spaced from the inner magnetic coupler by the thrust tube and is magnetically coupled with the inner magnetic coupler to be moved by the inner magnetic coupler.

In some embodiments, the thrust tube includes a longitudinal projection on the outer surface for guiding the transportation module. A guide member is connected with the inner magnetic coupler, and includes a guide engagement portion disposed in the guide slot.

DESCRIPTION OF THE SPECIFIC EMBODIMENTS

Figure 1:
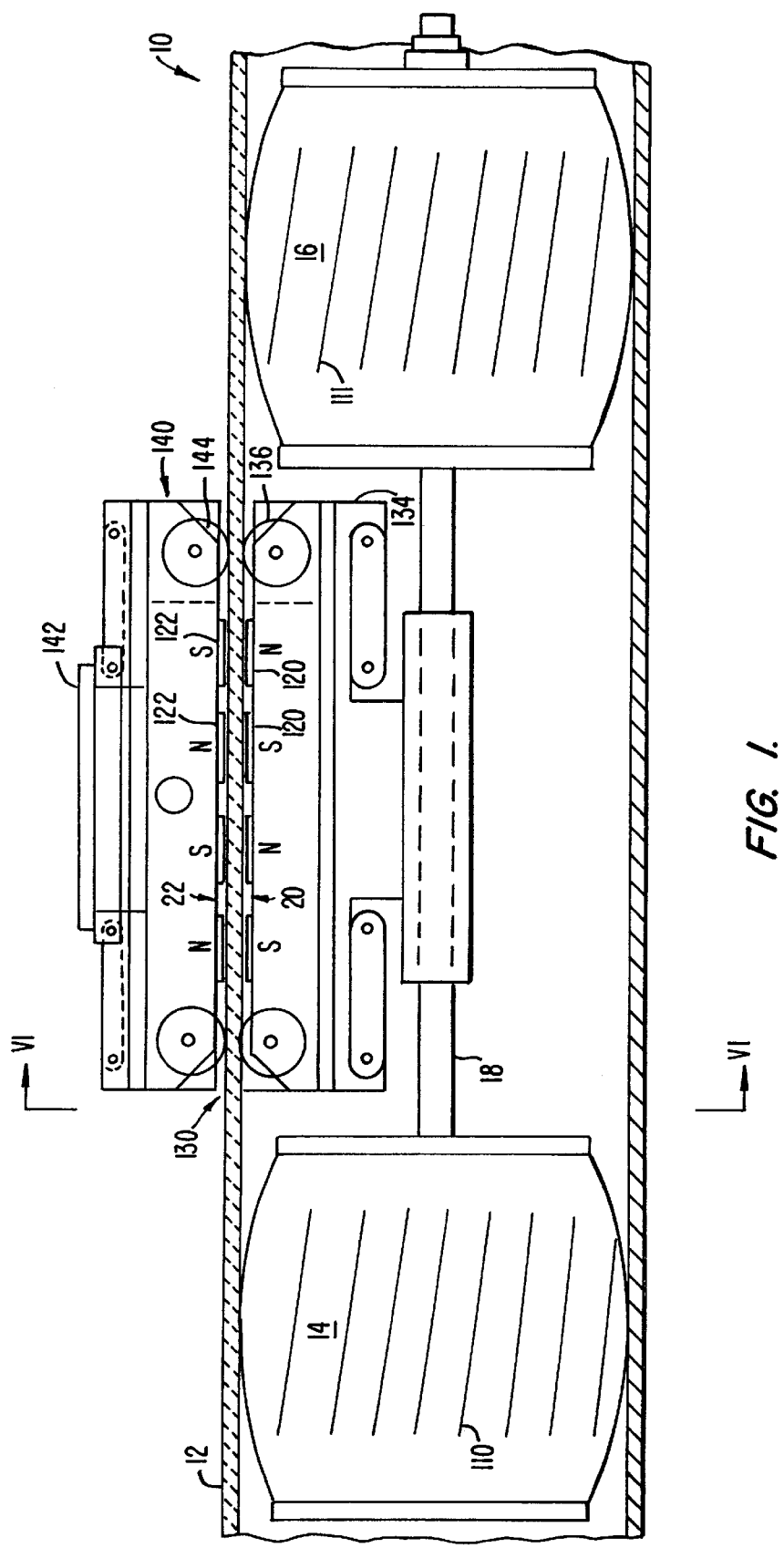
FIG. 1 is a partial cross-sectional front view of a pod assembly disposed in a guide tube for supporting a transportation module in accordance with an embodiment of the present invention.
Figure 2:
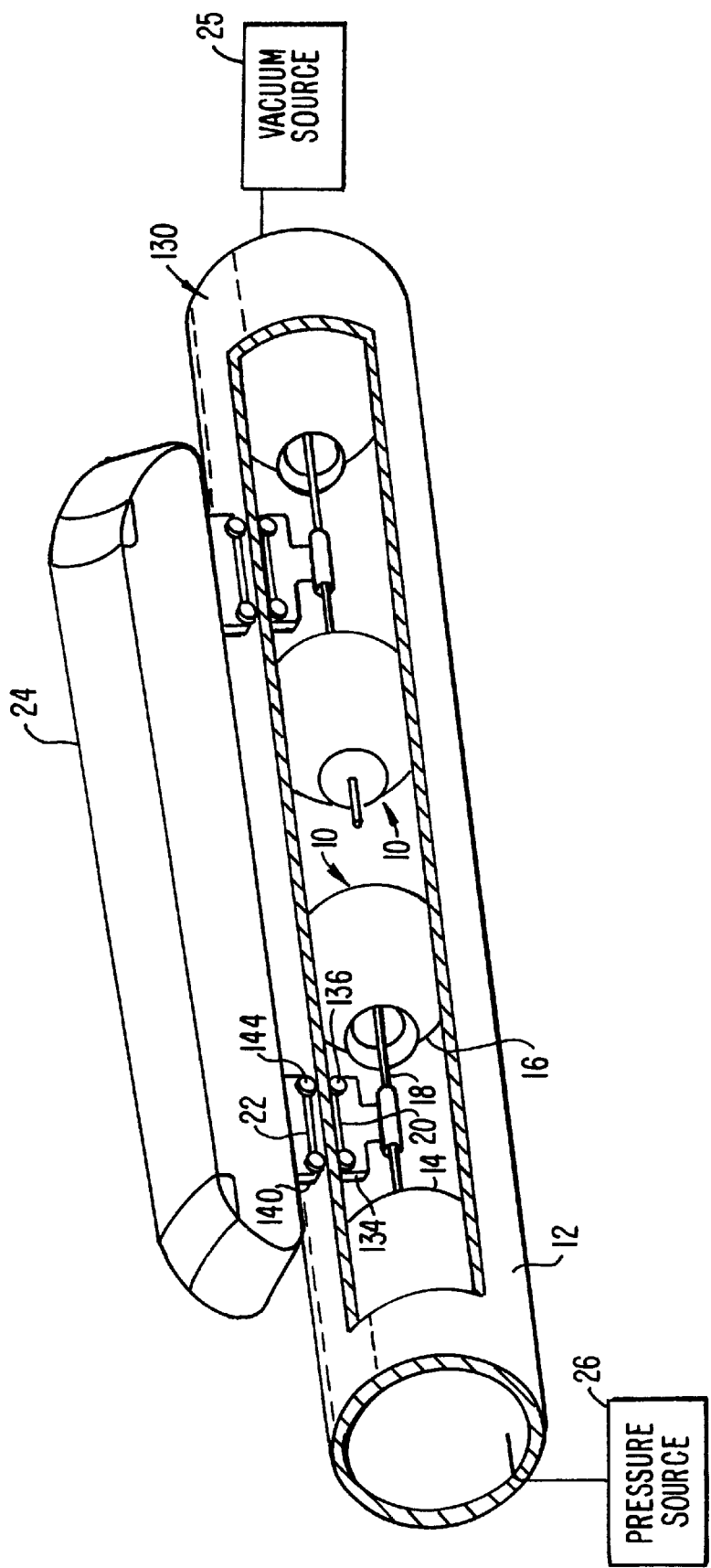
FIG. 2 is a perspective view with a cut-away portion of a guideway system illustrating the pod assembly of FIG. 1 disposed in the guide tube and a transportation module disposed outside the guide tube.

FIGS. 1 and 2 show a pod assembly or otter assembly 10 disposed in a guide tube or thrust tube 12, which in this embodiment is a generally circular tube. The pod assembly 10 includes a thrust pod 14 and a passive pod 16 coupled together by a hollow shaft or axle 18. The guide tube 12 guides the pods 14, 16 for traveling therein. The guide tube 12 is sealed at the ends. An inner magnetic coupler 20 is connected with the axle 18. An outer magnetic coupler 22 is disposed outside the guide tube 12, and is magnetically coupled with the inner magnetic coupler 20. A transportation module or cargo unit 24 is connected with the outer magnetic coupler 22. When the pod assembly 10 travels inside the guide tube 12, its movement is transferred via the magnetic couplers 20, 22 to thrust the transportation module 24 along the exterior surface of the guide tube 12.

FIG. 2 shows a vacuum source 25 coupled with the downstream side of the pod assembly 10 and a pressure source 26 coupled with the upstream side of the pod assembly 10. Either or both of the vacuum source 25 and the pressure source 26 can produce pressure differential between the upstream region and the downstream region of the pod assembly 10 to drive the pod assembly along the length of the guide tube 12. The guide tube 12 is closed to form a closed system inside. The closed tube 12 provides improved mechanical integrity and pressure integrity.

Pod Assembly

Figure 3:
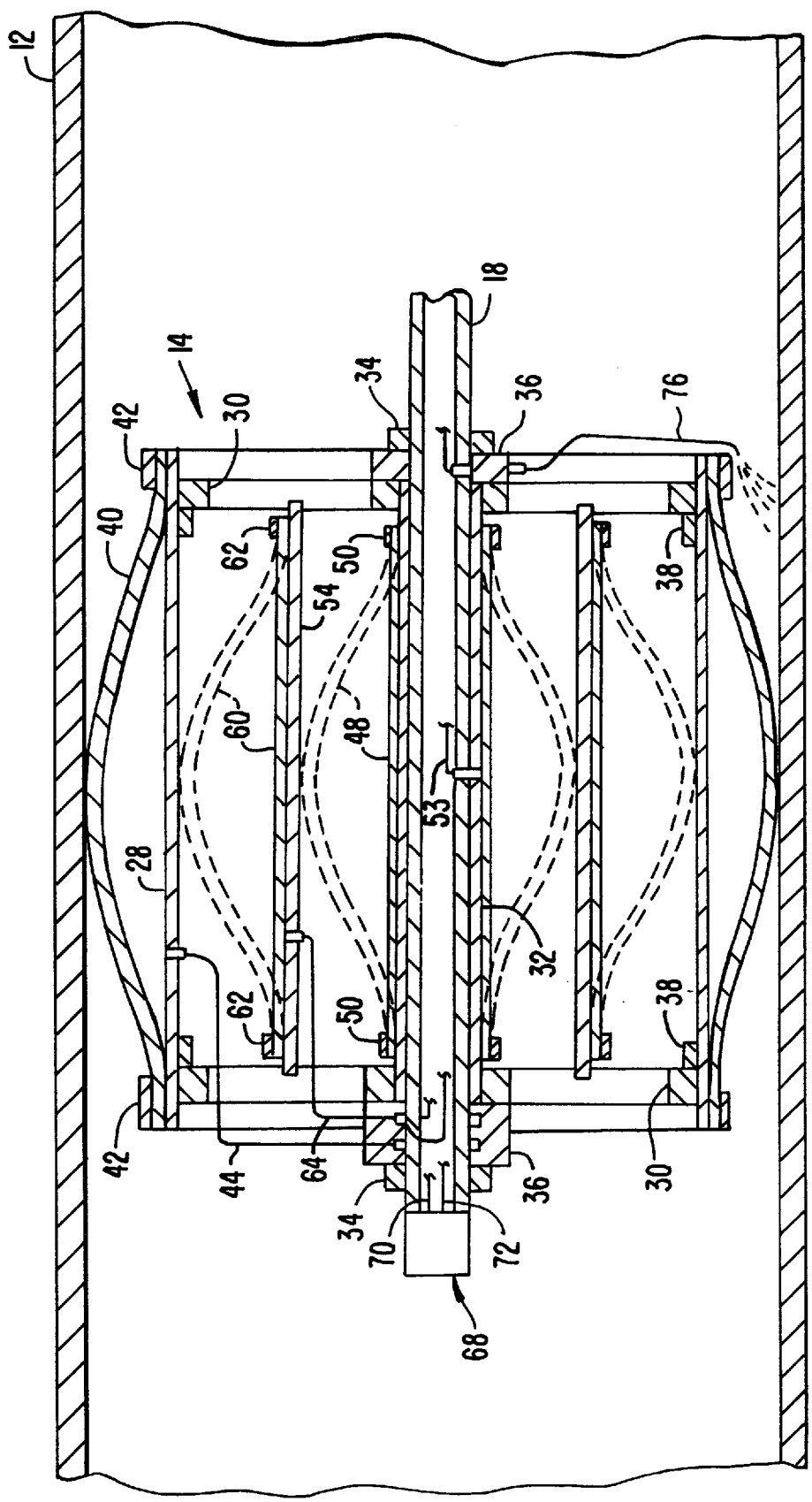
FIG. 3 is a partial cross-sectional front view of a thrust pod in the pod assembly of FIG. 1.
Figure 4:
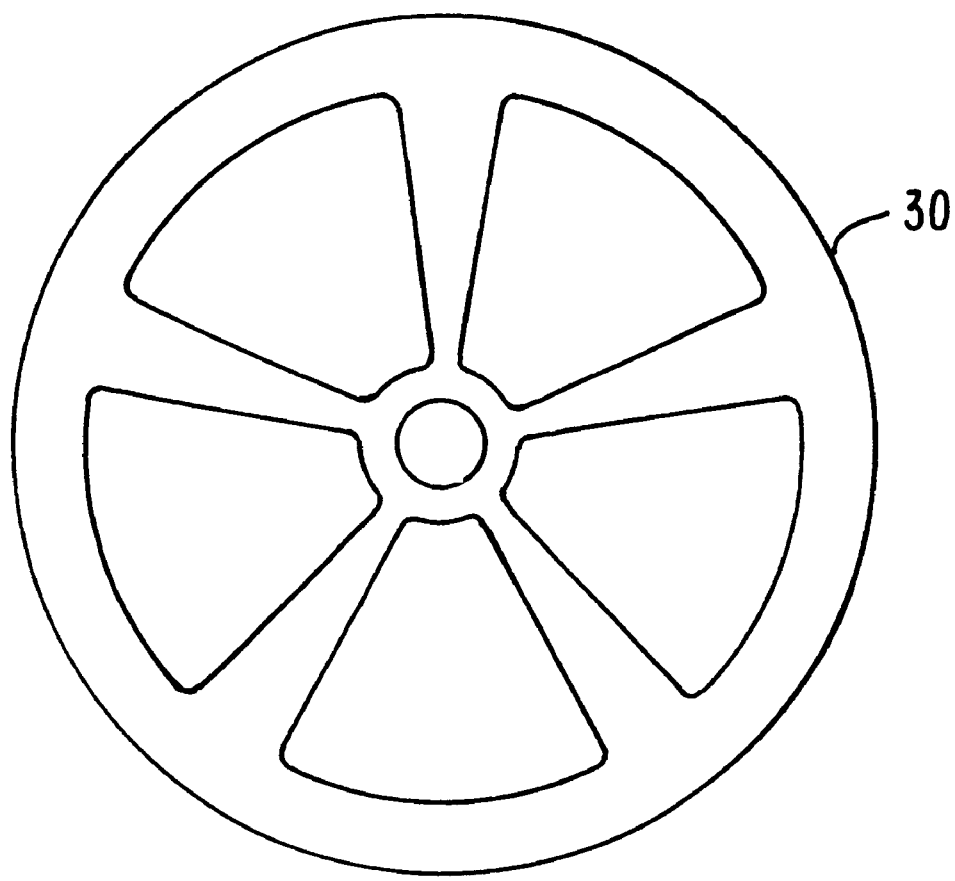
FIG. 4 is an elevational view of a hub in the thrust pod of FIG. 3.

The detailed structure of the thrust pod 14 is shown in FIG. 3. The thrust pod 14 includes a generally cylindrical wall 28 having a front end and a rear end. In this embodiment, the cylindrical wall 28 is generally circular and has a smaller diameter than the interior of the guide tube 12. The axle 18 extends along the axis of the cylindrical wall 28, and is connected with the cylindrical wall 28 by a pair of hubs 30 at the front end and rear end, respectively, of the wall 28. As best seen in FIG. 4, the hubs 30 include openings that allow gas to flow between the front end and the rear end of the cylindrical wall 28. A thrust tubular member 32 is desirably disposed between the axle 18 and the hubs 30. The thrust tubular member 32 surrounds the axle 18 and is located on the axle 18 by a pair of clamps 34, which also serve as thrust bearings. A pair of rotating seal and bearing assemblies 36 connect the two hubs 30, respectively, with the thrust tubular member 32, so that the hubs 30 together with cylindrical wall 28 and tubular member 32 are rotatable relative to the axle 18 while maintaining a sealed connection therebetween. The axle 18 is generally a nonrotating member. A pair of rings 38 attached to the cylindrical wall 28 are used to locate the hubs 30 relative to the cylindrical wall 28. The hubs 30 may be attached to the rings 38 using bolts or the like.

A pod tire 40 is secured to the exterior of the cylindrical wall 28 by a pair of tire clamps 42 disposed at the two ends of the wall 28. The tire clamps 42 seal the connection, thereby forming an airtight cavity or enclosure between the pod tire 40 and the cylindrical wall 28. The enclosure is expandable with pressurized air or gas supplied through a gas line 44 connected through the thrust tubular member 32 and the hollow axle 18 to a gas source. The gas line 44 is coupled to the hollow axle 18 through the rotary seal and bearings assembly 36 to ensure proper gas connection and control even when the cylindrical wall 28 and hubs 30 rotate relative to the axle 18. FIG. 3 shows the pod tire 40 in an inflated state in contact with the guide tube 12, desirably in an approximately tangential manner. The pod tire 40 preferably has a smooth surface for making contact with the guide tube 12. The pressure in the enclosure can be adjusted remotely by controlling the gas flow through the gas line 44, for instance, from the transportation module 24.

A membrane or bladder 48 is coupled to the exterior of the thrust tubular member 32 by a pair of bladder clamps 50 disposed near the two hubs 30, respectively. The bladder clamps 50 seal the connection to provide an airtight cavity or enclosure between the bladder 48 and the thrust tubular member 32. The enclosure is expandable by air or gas supplied via a gas line 52 extending through the thrust tubular member 32 connecting in a rotatable manner with the hollow axle 18 to a gas source which is typically controlled remotely from the transportation module 24. In FIG. 3, the deflated position of the bladder 48 is shown in solid lines, while the inflated position is depicted in broken lines. In the inflated position, the bladder 48 is in contact with an inner tubular housing 54 to block gas flow through the portion of the thrust pod 14 between the thrust tubular member 32 and the inner tubular housing 54. The inner tubular housing 54 is coupled with and supported by the hubs 30. In the embodiment shown, the inner tubular housing 54 is received into grooves or slots in the hubs 30.

Another bladder 60 is coupled to the exterior of the inner tubular housing 54 by a pair of bladder clamps 62 disposed near the hubs 30, respectively. The bladder clamps 62 seal the connection to provide an airtight cavity or enclosure between the outer bladder 60 and the inner tubular housing 54. The enclosure is expandable by air or gas supplied through a gas line 64 connected through the rotary seal 36 and the hollow axle 18 to a gas source. The pressure in the enclosure is typically adjusted remotely by controlling the gas flow through the gas line 64 from the transportation module 24. The gas line 64 is coupled to the thrust tubular member 32 and hollow axle 18 through the rotary seal and bearings assembly 36 to ensure proper gas connection and control even when the cylindrical wall 28 and hubs 30 rotate relative to the axle 18. In FIG. 3, the deflated position of the outer bladder 60 is shown in solid lines, while the inflated position is depicted in broken lines. In the inflated position, the outer bladder 60 comes into contact with the cylindrical wall 28 to block gas flow through the portion of the thrust pod 14 between the inner tubular housing 54 and the cylindrical wall 28.

A head assembly 68 is desirably mounted to the front of the thrust pod assembly 14 to provide lights, camera, and the like. In the embodiment shown in FIG. 3, the head assembly 68 is attached to the front end of the nonrotating axle 18 and seals the front end. A video cable 70 is coupled between the camera in the head assembly 68 and a video receiver in the transportation module 24 for monitoring conditions in the guide tube 12. A power cable 72 provides power to the head assembly 68.

The thrust pod assembly 14 desirably includes a water line 76 supplying water for spraying onto the exterior of the pod tire 40, as illustrated in FIG. 3. The water line 76 extends through the rotary seal 36 and axle 18 to a water source. The water line 76 is coupled to the water source through the rotary seal and bearings assembly 36 to ensure proper gas and water connection and control even when the cylindrical wall 28 and hubs 30 rotate relative to the axle 18. The water source is typically carried on board the pod assembly 10. The water spray provides a lubricant layer between the pod tire 40 and the guide tube 12 that can lead to a hydroplaning effect between the pod tire 40 and guide tube 12 which can significantly reduce friction. It is noted that other fluids may be used instead of water The pod tire 40 is made of a low friction material such as Teflon, and is inflated to provide a very small circumferential clearance between the pod tire 40 and the guide tube 12 to minimize air leakage past it while minimizing friction between it and the guide tube wall.

Figure 5:
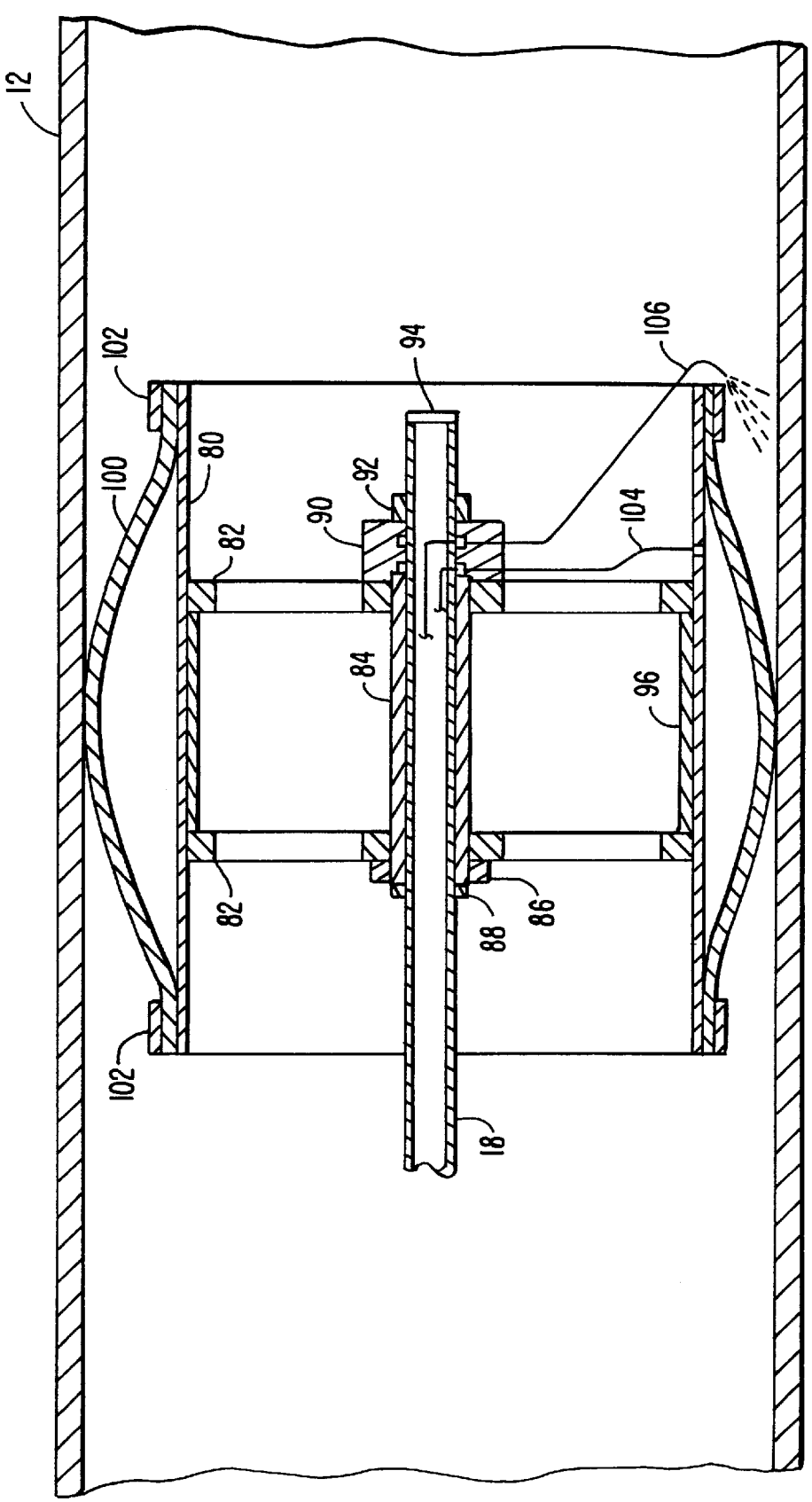
FIG. 5 is a partial cross-sectional front view of a passive pod in the pod assembly of FIG. 1.

As illustrated in FIG. 5, the passive pod 16 includes a generally cylindrical wall 80 having a front end and a rear end. In this embodiment, the cylindrical wall 80 is generally circular and smaller in diameter than the interior of the guide tube 12. The cylindrical wall 80 is substantially identical to the cylindrical wall 28 of the thrust pod assembly 14 in a specific embodiment. The axle 18 extends along the axis of the cylindrical wall 80, and is connected with the cylindrical wall by a pair of hubs 82 which are inboard hubs disposed inward from the front and rear ends of the wall 80, respectively. The hubs 82 include openings through which gas can flow between the front end and the rear end of the cylindrical wall 80. In one embodiment, the hubs 82 are substantially identical to the hubs 30 in the thrust pod assembly 14 as shown in FIG. 4.

A passive tubular member 84 is desirably disposed between the axle 18 and the hubs 82, as illustrated in FIG. 5. The passive tubular member 84 surrounds the axle 18. The tubular member 84 is rotatable on the axle 18 near one end by a removable collar 86 and clamp and bearing 88, and near the other end by a rotary seal and bearing 90 and clamp and thrust bearing 92. The connection allows the hubs 82 and cylindrical wall 80 to rotate relative to the axle 18 while maintaining a sealed connection therebetween. The end of the axle 18 is sealed with a sealing plug 94. A ring 96 is attached to the interior surface of the cylindrical wall 80 to locate the hubs 82 relative to the cylindrical wall 80. The hubs 82 may be attached to the ring 96 using bolts or the like. The passive pod 16 includes no thrust control features.

A passive pod tire 100 is coupled to the exterior of the cylindrical wall 80 by a pair of tire clamps 102 disposed at the two ends of the wall 80, respectively. The tire clamps 82 seal the connection to provide an airtight cavity or enclosure between the pod tire 100 and the cylindrical wall 80. The enclosure is expandable by air or gas supplied through a gas line 104 connected through the passive tubular member 84 and the hollow axle 18 to a gas source. The gas line 104 is coupled to the hollow axle 18 through the rotary seal and bearings assembly 90 to ensure proper gas connection and control even when the cylindrical wall 80 and hubs 82 rotate relative to the axle 18. FIG. 5 shows the pod tire 100 in an inflated state in contact with the guide tube 12. The pod tire 100 preferably has a smooth surface for making contact with the guide tube 12, and may be substantially identical to the pod tire 40 of the thrust pod assembly 14. The pressure in the enclosure is typically adjusted remotely by controlling the gas flow through the gas line 104 from the transportation module 24.

As shown in FIG. 5, the passive pod assembly 16 desirably includes a water line 106 supplying water for spraying to the pressure side of the pod tire 100, which is similar to the water line 76 used for the thrust pod assembly 14. The water line 106 extends through the rotary seal 36 and axle 18 to a water source. The water line 106 is coupled to the water source through the rotary seal and bearings assembly 90 to ensure proper gas connection and control even when the cylindrical wall 80 and hubs 82 rotate relative to the axle 18. The water spray provides a lubricant between the pod tire 100 and the guide tube 12, and may produce a hydroplaning effect between the pod tire 100 and guide tube 12. The pod tire 100 is inflated to provide a very small circumferential clearance between the pod tire 100 and the guide tube 12.

The radii of curvature of the thrust pod tire 40 and passive pod tire 100 in the embodiment shown are generally equal to the inner diameter of the guide tube 12. Of course, the radii of curvature may vary depending on physical factors required for specific transportation modules and terrain requirements. The small circumferential clearance between the thrust pod tire 40 and the guide tube 12 and the small clearance between the passive pod tire 100 and the guide tube 12 provide leakage of small amounts of gas around the thrust pod 14 and passive pod 16. This produces a venturi effect which tends to center the pods 14, 16 in the guide tube 12. Moreover, the rotation of the pods 14, 16 inside the guide tube 12 produces more even wear of the pod tires 40, 100. As shown in FIG. 1, rotational treads 110, 111 are provided on the external surfaces of the pod tires 40, 100 to cause rotation of the pods 14, 16 as they move inside the guide tube 12. The rotational treads 110, 111 are slanted slightly to provide slow rotation in the embodiment shown.

The pod assembly 10 is desirably made of light-weight, high-strength materials such as titanium, aluminum, high performance steels, and plastic materials. The combination of the thrust pod 14 and the passive pod 16 provides a stable support for the inner linkage 134 and inner magnetic coupler 20. Additional pods may be added for a larger or longer transportation module. For example, additional passive pods may be added to lengthen the pod assembly for supporting a longer transportation module.

In operation, the right side or upstream side of the pod assembly 10 is subjected to a higher pressure than the downstream side or left side by drawing a vacuum on the left side using the vacuum source 25, or pumping a gas into the right side using the pressure source 26, or both. The first bladder 48 and second bladder 60 of the thrust pod 14 are inflatable by gas through the gas line 44 and the gas line 64, respectively. The bladders 48, 60 are inflated to varying degrees to modulate gas passage through the pod assembly 10 and adjust the speed of pod assembly 10. In the fully inflated state, the bladders 48, 60 substantially block gas flow between the upstream and downstream sides of the pod assembly 10, resulting in maximum thrust of the pod assembly 10 in the guide tube 12. Water from the water line 106 lubricates the contact region between the thrust pod tire 82 and the guide tube 12. The contact region between the passive pod tire 100 of the passive pod 16 is also lubricated by water from the water line 106. The treads 110, 111 on the exterior of the pod tires 40, 100 cause the thrust pod 14 and passive pod 16 to rotate for more even wear.

Magnetic Coupling

Magnetic coupling is used to couple the pod assembly 10 and transfer its thrust to the transportation module 24. As shown in FIGS. 1 and 2, the inner magnetic coupler 20 is disposed adjacent the inner surface of the wall of the guide tube 12, while the outer magnetic coupler 22 is disposed adjacent the outer surface of the wall of the guide tube 12. The magnetic couplers 20, 22 may employ various mechanisms for generating magnetic fields including, for example, the use of small high strength permanent magnets 120, 122; or electromagnets.

The guide tube 12 includes a longitudinal window 130 disposed between the magnetic couplers 20, 22. The window 130 is desirably made of a high strength non-metallic material such as plastic or glass to eliminate any braking effect caused by induced eddy currents. In some embodiments, the entire guide tube 12 may be made of a high strength non-metallic material. In other embodiments, the guide tube 12 is made of a metallic pipe with a longitudinal window 130 of plastic, glass, or other non-metallic material. The non-metallic material advantageously has generally the same magnetic characteristics of an air gap and allows magnetic coupling without adverse braking effects.

Figure 6:
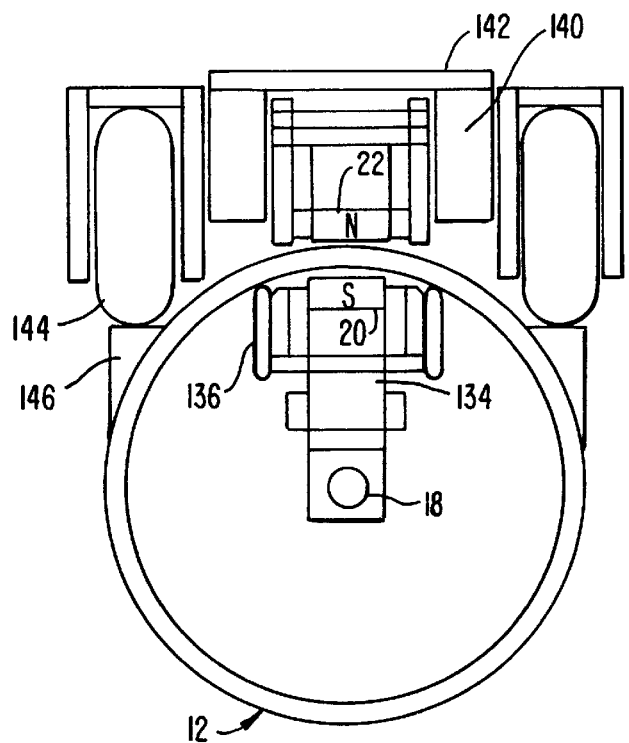
FIG. 6 is a partial cross-sectional end view along VI—VI of the guideway system of FIG. 1.

The inner magnetic coupler 20 is coupled with the axle 18 of the pod assembly 10 via an inner linkage 134 to avoid imparting magnetic loading on the pod assembly 10. The inner linkage 134 is typically made of a non-metallic material such as plastic. As seen in FIGS. 1, 2, and 6, inner wheels or rollers 136 are coupled to the inner magnetic coupler 20 to provide low friction roller contact with the inner surface of the guide tube 12. The inner magnetic coupler 20 is supported by the pod assembly 10, but its position with respect to the inner surface of the guide tube 12 may change during movement of the pod assembly 10. The inner wheels 136 maintain a proper spacing between the inner magnetic coupler 20 and the inner surface of the guide tube 12 to allow the inner magnetic coupler 20 to be as close to the inner surface of the guide tube 12 as possible without touching or dragging on the guide tube 12. For example, the spacing between the inner magnetic coupler 20 and the inner surface of the guide tube 12 is maintained at about 0.03–0.5 inch. This enables the inner magnetic coupler 20 to transmit the maximum possible magnetic thrust with minimum friction. Of course, the inner wheels 136 may be replaced by other types of low friction members such as low friction skids and air cushions. FIGS. 1 and 2 show inner wheels 136 at the two ends of the inner magnetic coupler 20, but additional wheels may be added between the two ends. The wheels 136 desirably are pneumatic tires.

Figure 7:
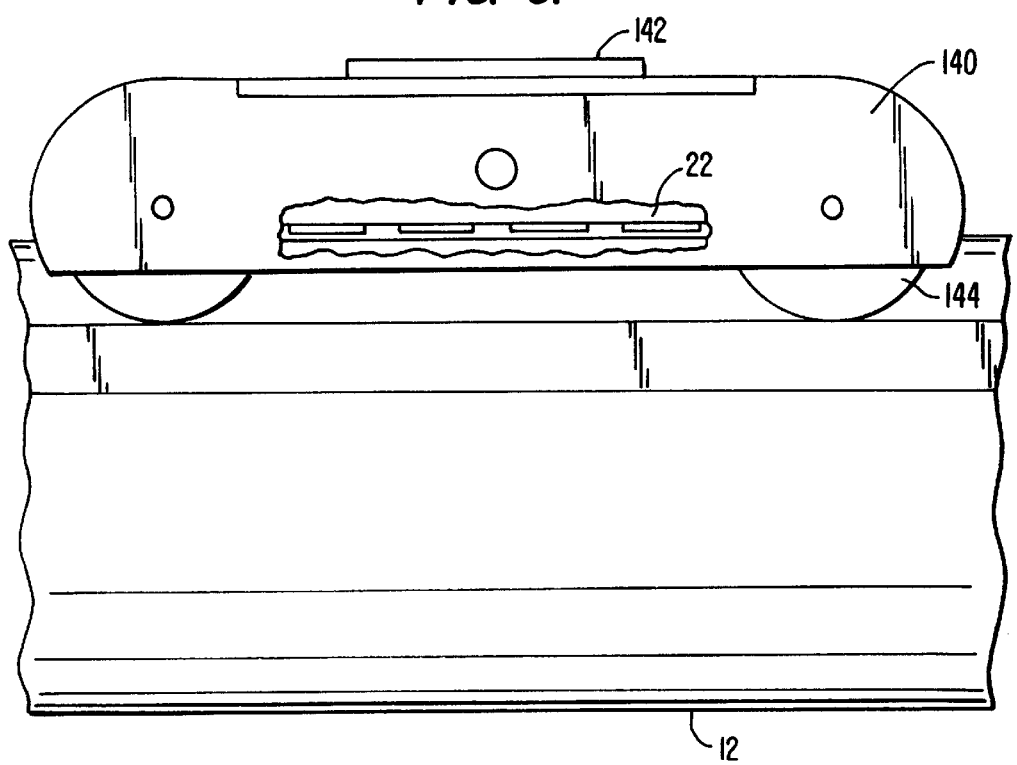
FIG. 7 is a front elevational view of a transportation module support assembly in the guideway system of FIG. 2.

As illustrated in FIGS. 1, 6, and 7, an outer linkage 140 is provided to connect the outer magnetic coupler 22 with the transportation module 24 to avoid imparting magnetic loading on the module 24. The outer linkage 140 is typically made of a non-metallic material such as plastic. As best seen in FIG. 7, the outer linkage 140 is a truck assembly which desirably includes a mounting swivel 142 for connecting to the transportation module 24. Outer wheels or rollers 144 are coupled to the outer magnetic coupler 22 to provide low friction roller contact with the outer surface of the guide tube 12. FIG. 6 shows the outer wheels 144 supported by outer wheel supports 146 provided on the outer surface of the guide tube 12. The outer wheels 144 maintain a proper spacing between the outer magnetic coupler 22 and the outer surface of the guide tube 12 to allow the outer magnetic coupler 22 to be as close to the outer surface of the guide tube 12 as possible without touching or dragging on the guide tube 12. For example, the spacing between the outer magnetic coupler 22 and the outer surface of the guide tube 12 is maintained at about 0.03–0.5 inch. This enables the inner magnetic coupler 20 to transmit the maximum possible magnetic thrust to the outer magnetic coupler 22 with minimum friction. The outer wheels 144 may be replaced by other types of low friction members such as low friction skids and air cushions. The outer wheels 144 are typically provided at the two ends of the outer truck assembly 140, and additional wheels may be added between the two ends. The wheels 144 desirably are pneumatic tires.

Both the inner linkage 134 and the outer linkage 140 are set up in an opposing manner with enough clearance to enable the desired adjusting movement. The opposed linkage arrangement facilitates and optimizes the bi-directional capability of the pod assembly 10. Each transportation module 24 may typically incorporate two truck assemblies 140 with only one of the assemblies 140 carrying an outer magnetic coupler 22. In some embodiments, both truck assemblies 140 may be equipped with outer magnetic couplers 22.

Because the transportation module 24 and the pod assembly 10 are not mechanically connected, control of the pod assembly 10 is desirably accomplished remotely, for instance, by radio control via a close coupled antenna disposed outside the window 130 for controlling an appropriate power module for all control functions of the pod assembly 10.

Magnetic coupling allows disengagement of the pod assembly 10 and transportation module 24 without any mechanical linkage or disengagement. Disengagement can be readily accomplished by reducing the magnetic field strength between the inner magnetic coupler 20 and the outer magnetic coupler 22. Because the transportation module 24 is supported by the exterior surface of the guide tube 12, the weight of the transportation module 24 is not carried by the pod assembly 10. In the event that either the pod assembly 10 or the transportation module 24 is to be stopped or severely slowed by an obstruction or other unexpected event, the magnetic coupling would act as a shear pin and reduce damage to the system.

Figure 8:
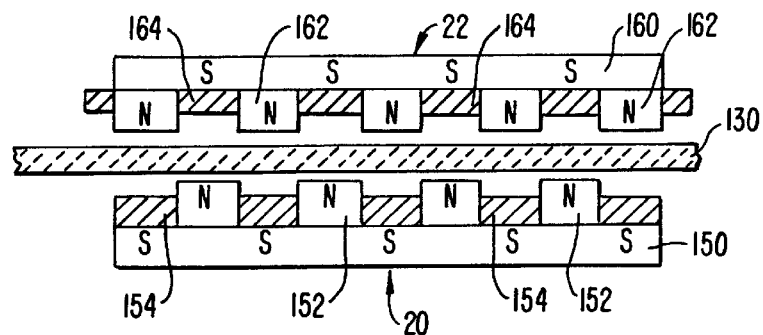
FIG. 8 is an elevational view schematically illustrating a magnetic coupling mechanism substantially in static mode according to an embodiment of the invention.
Figure 9:
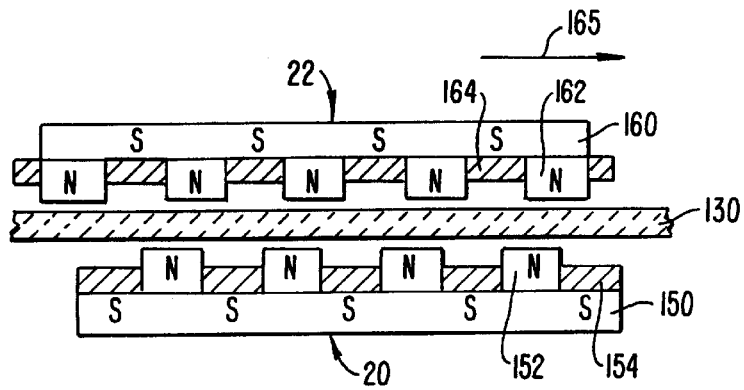
FIG. 9 is an elevational view schematically illustrating the magnetic coupling mechanism of FIG. 8 in dynamic mode.

FIGS. 8 and 9 illustrate an example of a magnetic coupling mechanism including the inner magnetic coupler 20 and outer magnetic coupler 22 disposed on opposite sides of the longitudinal window 130 of the guide tube 12. The inner magnetic coupler 20 includes an inner magnetic keeper bar or shunt 150. A plurality of inner magnets or magnetic blocks 152 are attached to the inner magnetic bar 150. The inner magnets 152 are disposed closer to the window 130 than the inner magnetic bar 150, and have the same polarity which is opposite from the polarity of the inner magnetic bar 150. In the embodiment shown, the inner magnetic bar 150 has a south polarity and the inner magnets 152 have a north polarity. The inner magnets 152 are spaced alternately by nonmagnetic inner spacers 154, which may be made of, for instance, high strength plastic such as high density polyethylene.

The outer magnetic coupler 22 includes an outer magnetic bar 160 and a plurality of outer magnets or magnetic blocks 162 attached thereto. The outer magnets 162 are disposed closer to the window 130 than the outer magnetic bar 160, and have the same polarity which is opposite from the polarity of the outer magnetic bar 160. The outer magnets 162 are spaced alternately by nonmagnetic outer spacers 164. The inner and outer magnetic bars 150, 160 have the same polarity, while the inner and outer magnets 152, 162 have the same opposite polarity.

In the substantially static mode as shown in FIG. 8, the couplers 20, 22 are either stationary or moving in low thrust, and the inner magnets 152 and outer magnets 162 are staggered in position. In the specific embodiment shown, there is substantially no overlap in position between the inner magnets 152 and outer magnets 162. The inner magnets 152 are in attraction with the opposite polarity outer magnetic bar 160 while the outer magnets 162 are in attraction with the opposite polarity inner magnetic bar 150. This arrangement is typically maintained for movement in the low thrust mode. In the dynamic mode as shown in FIG. 9, the pod assembly 10 is thrusted along the guide tube 12 (FIGS. 1 and 2), moving the inner magnetic coupler 20 which in turn drives the outer magnetic coupler 22 via the magnetic coupling in the direction 165. The movement of the outer magnetic coupler 22 lags behind that of the inner magnetic coupler 20. As a result, there is significant overlap in position between the inner magnets 152 and outer magnets 162, and the amount of overlap increases toward complete alignment with an increase in speed.

Due to the overlap in position between the inner magnets 152 and outer magnets 162 of the same polarity, repulsive magnetic forces push the inner magnetic coupler 20 inward in a direction away from the inner surface of the guide tube 12 and lift the outer magnetic coupler 22 outward in a direction away from the outer surface of the guide tube 12. Because the magnets (152 or 162) are further displaced from the opposing magnetic bars (160 or 150), the attractive forces between the opposite polarity members (between 152 and 160 or between 162 and 150) are weaker, typically significantly weaker, than the repulsive forces between the same polarity magnets 152 and 162. Owing to the repulsive forces, the load on the truck assembly 140 is reduced while the transportation system is in motion. If the repulsive forces are sufficiently large, they may even elevate slightly the outer magnetic coupler 22 above the outer surface of the guide tube 12 and force the inner magnetic coupler 22 inward below the inner surface of the guide tube 12.

The resistive forces experienced by the transportation module 24 during movement include a combination of air resistance and drag such as friction between the guide tube 12 and the inner and outer wheels 136, 144 for the magnetic couplers 20, 22 (FIGS. 1 and 2). The repulsive magnetic forces decrease the running load of the transportation module 24 and outer magnetic coupler 22 on the window 130 and the outer surface of the guide tube 12, and the running load of the inner magnetic coupler 20 on the inner surface of the guide tube 12. This in turn reduces the friction and drag between the stationary guide tube 12 and the moving magnetic couplers 20, 22.

The arrangement permits operation in either the repulsion mode or the attraction mode. In the running or dynamic mode as shown in FIG. 9, the magnets 152, 162 of the magnetic couplers 20, 22 are pushed by the movement toward an alignment position, but do not reach complete alignment unless loaded beyond the thrust capability of the system.

Figure 10:
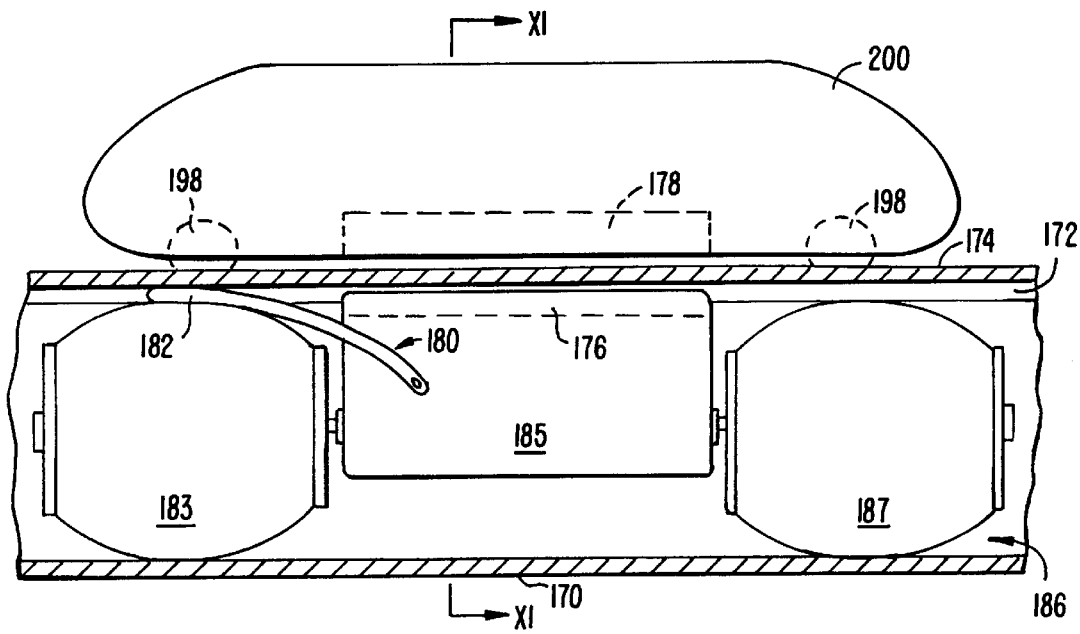
FIG. 10 is a partial cross-sectional front view of the guideway system illustrating another embodiment of the invention.
Figure 11:
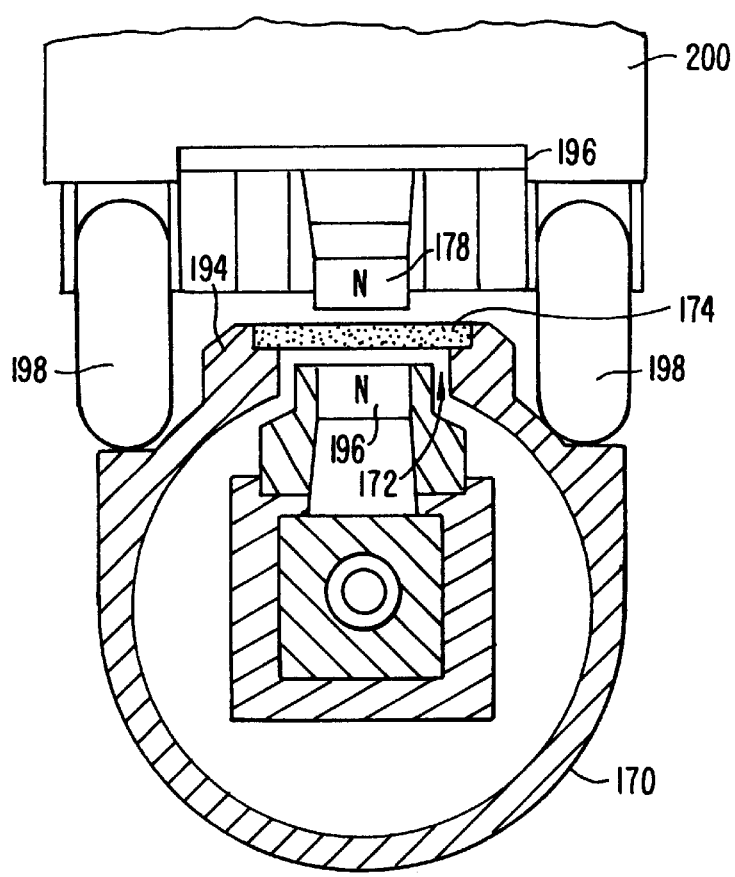
FIG. 11 is a partial cross-sectional end view along XI—XI of the guideway system of FIG. 10.

FIGS. 10 and 11 show another guide tube 170 having a keyway arrangement forming a longitudinal guide slot 172 at the window 174 between the inner magnetic coupler 176 and the outer magnetic coupler 178. The guide slot 172 receives a portion of the inner magnetic coupler 176 to prevent it from flipping over or away from center while in the dynamic or propulsion mode. The window 174 may be flat as shown in FIG. 11, and may be curved in another embodiment.

Figure 12:
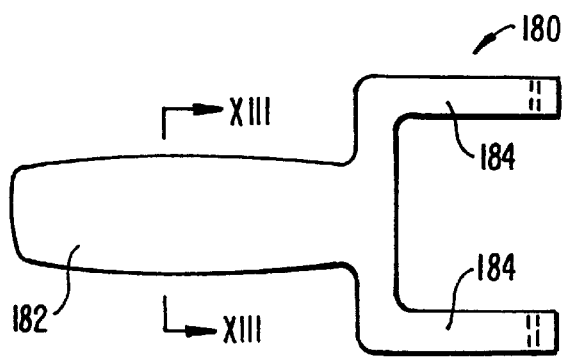
FIG. 12 is a top plan view of a guide key in the guideway system of FIG. 10.
Figure 13:
FIG. 13 is a cross-sectional view along XIII—XIII of the guide key of FIG. 12.

FIG. 10 shows a guide key or rocker key 180 which fits into the keyway guide slot 172. The guide member or key 180 includes a body 182 and a pair of arms 184, as seen in FIGS. 12 and 13. The arms 184 are rotatably connected to opposite sides of the inner magnetic coupler 176 using pivot pins or the like. Typically, the arms 184 are rotatably connected to the inner linkage 185 connected to the inner magnetic coupler 176 as shown in FIG. 10. The body 182 of the key 180 is kept in the guide slot 172 as a guide engagement portion by either the thrust pod 183 or the passive pod 187 of the pod assembly 186, as shown in FIG. 10. The key body 182 has clearance both fore and aft to allow negotiating sharp curves or bends of the guide tube 170. As shown in FIG. 13, the body 182 desirably includes rounded corners on the side facing the pods 183, 187.

As shown in FIG. 11, the keyway arrangement may provide an external longitudinal projection 194 at the location of the internal guide slot 172. The projection 194 may be used as a guide for the truck assembly 196 which is connected to the outer magnetic coupler 178 for supporting the transportation module 200. In the embodiment shown, the truck assembly 196 is supported by outer wheels 198 disposed on both sides of the projection 194.

In either the magnetic attraction or repulsion mode, guiding of the magnetic couplers 176, 178 has tracking advantages, especially for high speed applications. The keyway system provides secondary and accurate alignment and guidance for the inner magnetic coupler 176 and the pod assembly 186. The external projection 194 facilitates guidance and alignment of the truck assembly 196 for the transportation module 200.

The above-described arrangements of apparatus and methods are merely illustrative of applications of the principles of this invention and many other embodiments and modifications may be made without departing from the spirit and scope of the invention as defined in the claims. For instance, the guide tube, pod assembly, and magnetic couplers may have other shapes and configurations. The magnets may be high strength permanent magnets, electromagnets, or the like. The scope of the invention should, therefore, be determined not with reference to the above description, but instead should be determined with reference to the appended claims along with their full scope of equivalents.

What is claimed is:

1. A magnetically coupled drive apparatus comprising:
a wall made of a non-metallic, nonmagnetic material; and
a first magnetic coupler and a second magnetic coupler disposed on opposite sides of the wall, the first magnetic coupler being movable relative to the wall in a direction of movement, the second magnetic coupler being magnetically coupled with the first magnetic coupler to be moved by the first magnetic coupler, the first magnetic coupler including a first magnetic bar and a plurality of first magnetic blocks coupled to the first magnetic bar, the first magnetic blocks being disposed between the first magnetic bar and the wall, the first magnetic bar being opposite in polarity from the first magnetic blocks, the first magnetic blocks being arranged in series and being alternately spaced by a plurality of first nonmagnetic spacers in the direction of movement, the second magnetic coupler including a second magnetic bar and a plurality of second magnetic blocks coupled to the second magnetic bar, the second magnetic blocks being disposed between the second magnetic bar and the wall, the second magnetic bar being opposite in polarity from the second magnetic blocks, the second magnetic blocks being arranged in series and being alternately spaced by a plurality of second nonmagnetic spacers in the direction of movement, the second magnetic bar being the same in polarity as the first magnetic bar.

2. The apparatus of claim 1 wherein the first magnetic blocks and second magnetic blocks are staggered in position along the direction of movement when the first and second magnetic couplers are substantially stationary.

3. The apparatus of claim 2 wherein the first magnetic blocks and second magnetic blocks move closer toward substantial alignment with each other as the first and second magnetic couplers increase in speed.

4. The apparatus of claim 1 wherein the first and second nonmagnetic spacers comprise a material selected from the group consisting of high strength plastics.

5. The apparatus of claim 1 wherein the wall is a portion of a thrust tube, and wherein the first magnetic coupler is disposed in the thrust tube to be thrusted along the thrust tube by a drive member in the thrust tube.

6. The apparatus of claim 1 further comprising a first spacing member coupled to the first magnetic coupler for spacing the first magnetic coupler from the wall by a first preset minimum distance; and a second spacing member coupled to the second magnetic coupler for spacing the second magnetic coupler from the wall by a second preset minimum distance.

7. A method of magnetically driving a transportation module, the method comprising:
providing a drive member in a thrust tube including a longitudinal portion which is a non-metallic, nonmagnetic portion;
providing an inner magnetic coupler inside the thrust tube;
providing an outer magnetic coupler outside the thrust tube and connecting the outer magnetic coupler with the transportation module disposed on the thrust tube, the inner and outer magnetic couplers being disposed on opposite sides of the non-metallic portion of the thrust tube;
magnetically coupling the inner and outer magnetic couplers in attraction when the inner and outer magnetic couplers are substantially stationary with respect to the thrust tube; and
thrusting the drive member to move the inner magnetic coupler along the thrust tube in a direction of movement, the inner magnetic coupler moving the outer magnetic coupler and changing the magnetic coupling between the inner and outer magnetic couplers from attraction to repulsion as the speed increases,
wherein the inner magnetic coupler includes a first magnetic bar and a plurality of first magnetic blocks coupled to the first magnetic bar, the first magnetic blocks being disposed between the first magnetic bar and the non-metallic portion, the first magnetic bar being opposite in polarity from the first magnetic blocks, the first magnetic blocks being arranged in series and being alternately spaced by a plurality of first nonmagnetic spacers in the direction of movement; and wherein the outer magnetic coupler includes a second magnetic bar and a plurality of second magnetic blocks coupled to the second magnetic bar, the second magnetic blocks being disposed between the second magnetic bar and the non-metallic portion, the second magnetic bar being opposite in polarity from the second magnetic blocks, the second magnetic blocks being arranged in series and being alternately spaced by a plurality of second nonmagnetic spacers in the direction of movement, the second magnetic bar being the same in polarity as the first magnetic bar; and wherein magnetically coupling the inner and outer magnetic couplers in attraction comprises staggering the first magnetic blocks and second magnetic blocks in position along the direction of movement.

8. The method of claim 7 wherein the first magnetic blocks and second magnetic blocks move closer toward substantial alignment with each other as the drive member is thrusted along the thrust tube and increases in speed, thereby changing the magnetic coupling between the inner and outer magnetic couplers from attraction to repulsion.

9. The method of claim 7 wherein thrusting the drive member comprises flowing a gas in the thrust tube in the direction of movement to move the drive member along the thrust tube.

10. The method of claim 7 further comprising spacing the inner magnetic coupler from the thrust tube by a first preset minimum distance, and spacing the outer magnetic coupler from the thrust tube by a second preset minimum distance.

11. A method of magnetically driving a transportation module, the method comprising:
   providing a drive member in a thrust tube including a longitudinal portion which is a non-metallic, nonmagnetic portion;
   providing an inner magnetic coupler inside the thrust tube;
   providing an outer magnetic coupler outside the thrust tube and connecting the outer magnetic coupler with the transportation module disposed on the thrust tube, the inner and outer magnetic couplers being disposed on opposite sides of the non-metallic portion of the thrust tube;
   magnetically coupling the inner and outer magnetic couplers in attraction when the inner and outer magnetic couplers are substantially stationary with respect to the thrust tube; and
   thrusting the drive member to move the inner magnetic coupler along the thrust tube in a direction of movement, the inner magnetic coupler moving the outer magnetic coupler and the magnetic coupling between the inner and outer magnetic couplers from attraction to repulsion as the inner magnetic coupler shifts in position ahead of the outer magnetic coupler in the direction of movement.

12. The method of claim 11 wherein the inner magnetic coupler includes a first magnetic bar and a plurality of first magnetic blocks coupled to the first magnetic bar, the first magnetic blocks being disposed between the first magnetic bar and the non-metallic portion, the first magnetic bar being opposite in polarity from the first magnetic blocks, the first magnetic blocks being arranged in series and being alternately spaced by a plurality of first nonmagnetic spacers in the direction of movement; and wherein the outer magnetic coupler includes a second magnetic bar and a plurality of second magnetic blocks coupled to the second magnetic bar, the second magnetic blocks being disposed between the second magnetic bar and the non-metallic portion, the second magnetic bar being opposite in polarity from the second magnetic blocks, the second magnetic blocks being arranged in series and being alternately spaced by a plurality of second nonmagnetic spacers in the direction of movement, the second magnetic bar being the same in polarity as the first magnetic bar; and wherein magnetically coupling the inner and outer magnetic couplers in attraction comprises staggering the first magnetic blocks and second magnetic blocks in position along the direction of movement.

13. The method of claim 12 wherein the first magnetic blocks and second magnetic blocks move closer toward substantial alignment with each other as the drive member is thrusted along the thrust tube and increases in speed, thereby changing the magnetic coupling between the inner and outer magnetic couplers from attraction to repulsion.

14. The method of claim 11 wherein thrusting the drive member comprises reducing a pressure in a downstream region of the thrust tube downstream of the drive member to a downstream pressure below an upstream pressure of an upstream region of the thrust tube upstream of the drive member to move the drive member along the thrust tube.

15. The method of claim 14 wherein thrusting the drive member comprises drawing a vacuum in the downstream region of the thrust tube.

16. The method of claim 11 further comprising spacing the inner magnetic coupler from the thrust tube by a first preset minimum distance, and spacing the outer magnetic coupler from the thrust tube by a second preset minimum distance.

* * * * *